Jan. 20, 1931. C. W. KNIGHT 1,789,630
BAIT
Filed June 4, 1929
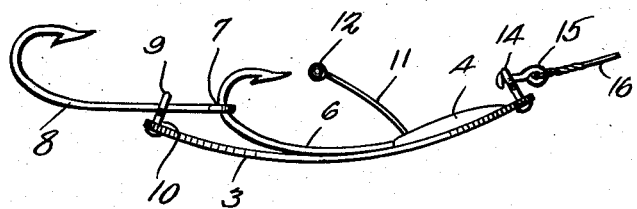
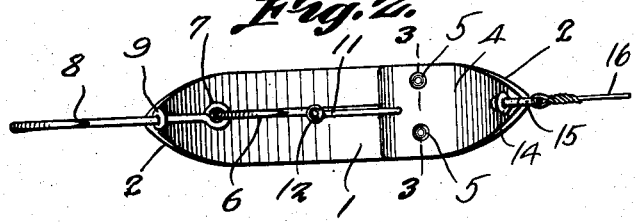
C. W. Knight Inventor
By C. A. Snow & Co.
Attorneys Patented Jan. 20, 1931

1,789,630

UNITED STATES PATENT OFFICE

CARL W. KNIGHT, OF TIFFIN, OHIO

BAIT

Application filed June 4, 1929. Serial No. 368,285.

This invention aims to provide an artificial bait for fish, the bait being so constructed that it will plane through the water as it is towed along, the bait having an oscillating, lateral movement, like a pendulum, but in a substantially horizontal plane, the bait being so constructed that it will not rotate on a longitudinal axis. Another object of the invention is to provide a bait which will have a life-like appearance. A further object of the invention is so to construct the bait that it will keep itself reasonably free from stuff that ordinarily fouls a fish lure.

It is within the province of the disclosure to improve generally and to enhance the utility of devices of that sort to which the present invention appertains.

With the foregoing and other objects in view, which will appear as the description proceeds, the invention resides in the combination and arrangement of parts, and in the details of construction hereinafter described and claimed, it being understood that changes may be made in the precise embodiment of the device herein disclosed, within the scope of what is claimed, without departing from the spirit of the invention.

In the accompanying drawings:

Figure 1 shows in side elevation, a device constructed in accordance with the invention;

Figure 2 is a top plan;

Figure 3 is a transverse section on the line 3—3 of Figure 2;

Figure 4 is a perspective view, showing the front end of the bait.

The bait forming the subject matter of this application comprises a plate-like body 1, generally made of metal, the body 1 tapering toward both ends, as shown at 2. The body 1 is arcuately curved from end to end as shown at 3. On the upper surface of the body 1, at the forward end thereof, there is a weight 4. The weight 4 may be painted in any desired color, such as red, and in the weight 4 there are depressions 5 which may be white, to simulate the eyes of an animal.

A forward hook 6 extends longitudinally of the body 1, the forward end of the hook being mounted in the weight 4. With the bend of the hook 6 is pivotally engaged an eye 7 at the forward end of a rear hook 8, which is mounted loosely in an eye 9 in the upper end of a bracket 10, the lower end of the bracket being mounted loosely in the rear end of the body 1. The numeral 11 indicates an upwardly and rearwardly inclined resilient guard, the lower end of which is mounted in the weight 4. The rear end of the guard 11 terminates in a knob or an enlargement 12 located near the point of the forward hook 6. On the forward end of the body 1 is mounted an eye 14 in which is journaled a swivel 15, the eye 14 and the swivel 15 constituting a towing bit for a line 16, the line being attached to the swivel.

Because the body 1 is downwardly curved from end to end, as shown at 3, and because the body 1 is supplied at its forward end with the weight 4, the body will plane through the water, and will not turn over or rotate about a longitudinal axis. The bait, however, will oscillate backwardly and forwardly, like a pendulum, but in a substantially horizontal plane, through an arc of 100 degrees, more or less. The guard 11, being resilient, can move somewhat, and the rear hook has a slight movement, because it is pivotally connected by means of the eye 7 with the forward hook 6, and because the hook 8 is mounted in the loop 9. The result is that the bait will present a life-like appearance when it is drawn through the water. The bait will not turn on a longitudinal axis, and the points of the hooks 6 and 8 will keep uppermost fouling of the hooks thereby being obviated to a large extent.

What is claimed is:

1. In a device of the class described, an arcuately curved body pointed at its forward end, a bracket on the rear end of the body, a forward hook on the body, a rear hook loosely engaged intermediate its ends with the bracket, and means for mounting the forward end of the rear hook loosely on the bend of the forward hook.

2. In a device of the class described, a body, a forward hook on the body, a rear hook engaged at its forward end with the bend of the forward hook, and means for connecting the rear hook intermediate its ends to the body, at a point to the rear of the forward hook and independently of the forward hook.

In testimony that I claim the foregoing as my own, I have hereto affixed my signature.

CARL W. KNIGHT.